(12) United States Patent
Tashev et al.

(10) Patent No.: US 8,615,393 B2
(45) Date of Patent: Dec. 24, 2013

(54) NOISE SUPPRESSOR FOR SPEECH RECOGNITION

(75) Inventors: Ivan J. Tashev, Kirkland, WA (US); Alejandro Acero, Bellevue, WA (US); James G. Droppo, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 11/560,210

(22) Filed: Nov. 15, 2006

(65) Prior Publication Data
US 2008/0114593 A1 May 15, 2008

(51) Int. Cl.
*G10L 21/00* (2013.01)
*G10L 21/02* (2013.01)

(52) U.S. Cl.
USPC ........... 704/226; 704/227; 704/228; 704/233; 704/244

(58) Field of Classification Search
USPC ................................. 704/226, 244
See application file for complete search history.

(56) References Cited

U.S. PATENT DOCUMENTS

| | | | |
|---|---|---|---|
| 5,583,968 A * | 12/1996 | Trompf | 704/232 |
| 5,956,679 A | 9/1999 | Komori | |
| 6,862,567 B1 | 3/2005 | Gao | |
| 6,950,796 B2 | 9/2005 | Ma | |
| 7,003,455 B1 | 2/2006 | Deng | |
| 7,035,796 B1 | 4/2006 | Zhang | |
| 7,054,808 B2 | 5/2006 | Yoshida | |
| 7,065,486 B1 | 6/2006 | Thyssen | |
| 7,590,530 B2 * | 9/2009 | Zhao et al. | 704/226 |
| 7,698,133 B2 * | 4/2010 | Ichikawa | 704/226 |
| 2004/0267530 A1 * | 12/2004 | He et al. | 704/256 |
| 2006/0100866 A1 | 5/2006 | Alewine | |

FOREIGN PATENT DOCUMENTS

| | | |
|---|---|---|
| EP | 1081685 | 8/2000 |
| WO | WO2005114656 | 5/2004 |

OTHER PUBLICATIONS

P.J. Wolfe and S. J. Godsiil, "Simple alternatives to the Ephraim and Malah suppression rule for speech enhancement", In Proceedings of the IEEE Workshop on Statistical Signal Processing, pp. 496-499, 2001.
J. Droppo, M. Mahajan, A. Gunawardana and A. Acero, "How to Train a Discriminative Front End with Stochastic Gradient Descent and Maximum Mutual Information", in Proceedings IEEE Automatic Speech Recognition and Understanding Workshop, 2005.
H.G. Hirsch and D. Pearce, "The Aurora Experimental Framework for the Performance Evaluations of Speech Recognition Systems under Noisy Conditions", in ISCA ITRW ASR, 2000.
Y. Ephraim, D. Malah, "Speech Enhancement Using a Minimum Mean-Square Error Short-Time Spectral Amplitude Estimator", IEEE Trans. on Acoustics, Speech and Signal Processing, vol. ASSP-32, No. 6, Dec. 1984.
M. Reidmiller and H. Braun, "A Direct Adaptive Method for Faster Backpropagation Learning: The RPROP Algorithm", in IEEE International Conference on Neural Networks, 1993, vol. 1, pp. 586-591.

(Continued)

*Primary Examiner* — Talivaldis Ivars Smits
*Assistant Examiner* — Shaun Roberts
(74) *Attorney, Agent, or Firm* — Kelly, Holt & Christenson PLLC (57) ABSTRACT

A noise suppressor for altering a speech signal is trained based on a speech recognition system. An objective function can be utilized to adjust parameters of the noise suppressor. The noise suppressor can be used to alter speech signals for the speech recognition system.

19 Claims, 4 Drawing Sheets

(56) References Cited

OTHER PUBLICATIONS

B. Noe, J. Sienel et al. "Noise Reduction for Nose Robust Feature Extraction for Distributed Speech Recognition" Art Dept., University of Nijmegen, Netherlands, 2001.

J.H.L. Hansen at al. "Stress Compensation and Noise Reduction Algorithms for Robust Speech Recognition" IEEE Proc. Int'l Conference, Scotland, May 1989.

Deng at al. "High-Performance Robust Speech Recognition Using Stero Training Data" Microsoft Research, Washington, 2001.

A. Erell and M. Weintraub "Spectral Estimation for Noise Robust Speech Recognition" SRI International, Abstract.

P.J. Wolfe and S. J. Godsill, "Simple alternatives to the Ephraim and Malah suppression rule for speech enhancement", In Proceedings of the IEEE Workshop on Statistical Signal Processing, pp. 496-499, 2001.

J.H.L. Hansen et al. "Stress Compensation and Noise Reduction Algorithms for Robust Speech Recognition" IEEE Proc. Int'l Conference, Scotland, May 1989.

Deng et al. "High-Performance Robust Speech Recognition Using Stereo Training Data" Microsoft Research, Washington, 2001.

R.J. McAulay and M.L. Malpass, "Speech enhancement using a soft-decision noise suppression filter," IEEE Transactions on Acoustics, Speech, and Signal Processing, vol. 28, No. 2, pp. 137-145, 1980.

* cited by examiner

NOISE SUPPRESSOR FOR SPEECH RECOGNITION

BACKGROUND

A pattern recognition system, such as a speech recognition system, takes an input signal and attempts to decode the signal to find a pattern represented by the signal. For example, in a speech recognition system, a speech signal is received by the recognition system and is decoded to identify a string of words represented by the speech signal.

Input signals can be corrupted by some form of noise. To improve performance of the pattern recognition system, an estimate of the amount of noise in a signal can be made. This estimate can be used to filter the signal and improve performance of the system.

The discussion above is merely provided for general background information and is not intended to be used as an aid in determining the scope of the claimed subject matter.

SUMMARY

A noise suppressor for altering a speech signal is trained based on a speech recognition system. An objective function can be utilized to adjust parameters of the noise suppressor. The noise suppressor can be used to alter speech signals for the speech recognition system.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION

DETAILED DESCRIPTION

Figure 1:
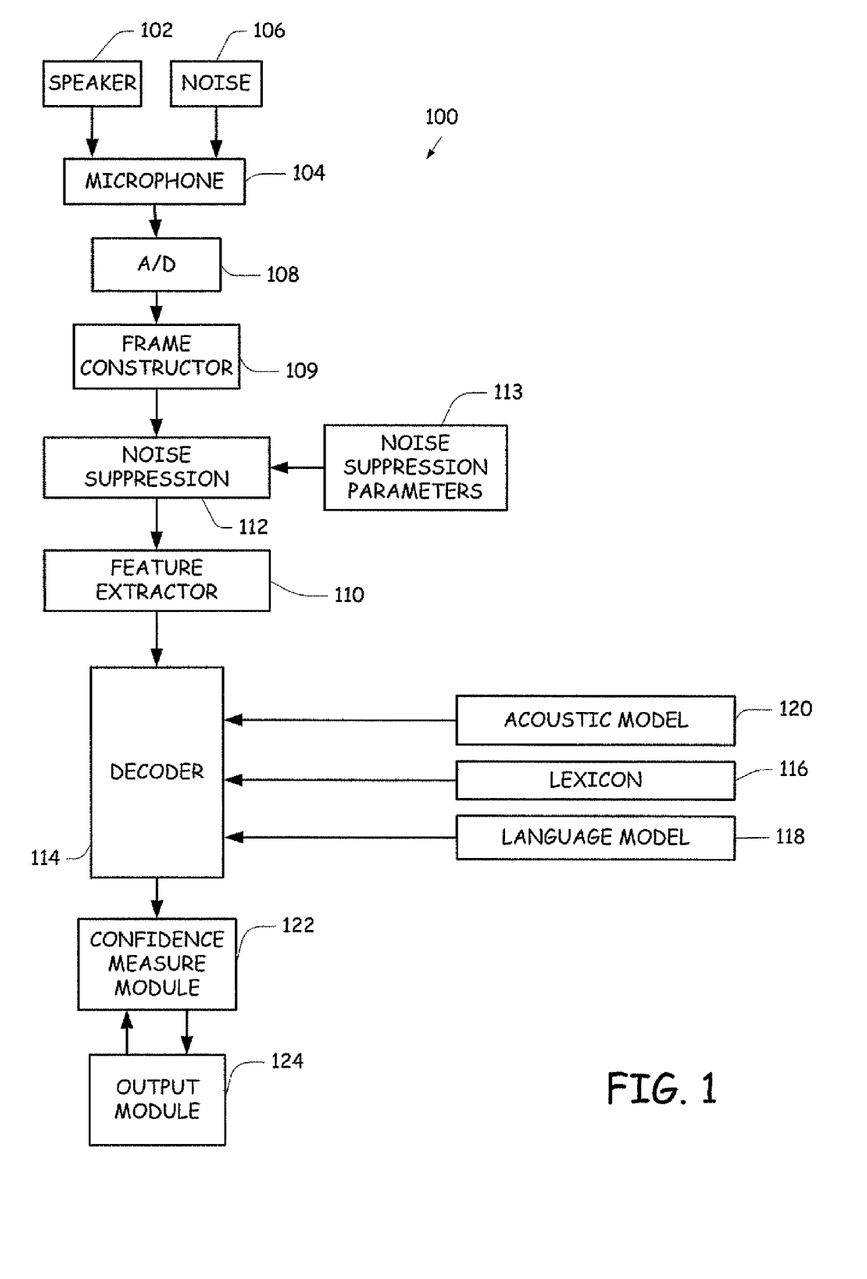
FIG. 1 is a block diagram of a speech recognition system.

FIG. 1 is a block diagram of a speech recognition system 100. In FIG. 1, a speaker 102, either a trainer or a user, speaks into a microphone 104. Microphone 104 also receives additive noise from one or more noise sources 106. The audio signals detected by microphone 104 are converted into electrical signals that are provided to analog-to-digital converter 108.

Although additive noise 106 is shown entering through microphone 104 in the embodiment of FIG. 1, in other embodiments, additive noise 106 may be added to the input speech signal as a digital signal after A-to-D converter 108 or can be a result of converting the signal from analog to digital.

A-to-D converter 108 converts the analog signal from microphone 104 into a series of digital values. In several embodiments, A-to-D converter 108 samples the analog signal at 16 kHz and 16 bits per sample, thereby creating 32 kilobytes of speech data per second. These digital values are provided to a frame constructor 109, which, in one embodiment, groups the values into 25 millisecond frames that start 10 milliseconds apart.

The frames of data created by frame constructor 109 are provided to noise suppression module 112, which suppresses noise from signals sent from analog-to-digital converter 108. Noise suppression module 112 accesses a plurality of noise suppression parameters 113. Noise suppression module 112 alters the frames received from frame constructor 109 based on the noise suppression parameters.

Noise suppression module 112 can include a voice activity detector, a noise model builder and a suppression gain module. The voice activity detector is used to assign probabilities to portions of a signal that constitute speech. The noise model builder builds a model of a probability of noise in the signal and the suppression gain module determines how much gain to apply to the signal. Noise suppression parameters 113 define parameters that are utilized by the voice activity detector, the noise model builder and the suppression gain module.

The noise suppressor passes the enhanced frames to feature extractor 110, which produces a stream of feature vectors that are each associated with a frame of the speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that system 100 is not limited to these feature extraction modules and that other modules may be used within the context of system 100.

The feature vectors are provided to a decoder 114, which identifies a most likely sequence of words based on the stream of feature vectors, a lexicon 116, a language model 118, and an acoustic model 120.

The most probable sequence of hypothesis words is provided to a confidence measure module 122. Confidence measure module 122 identifies which words are most likely to have been improperly identified by the speech recognizer, based in part on a secondary acoustic model (not shown). Confidence measure module 122 then provides the sequence of hypothesis words to an output module 124 along with identifiers indicating which words may have been improperly identified.

Figure 2:
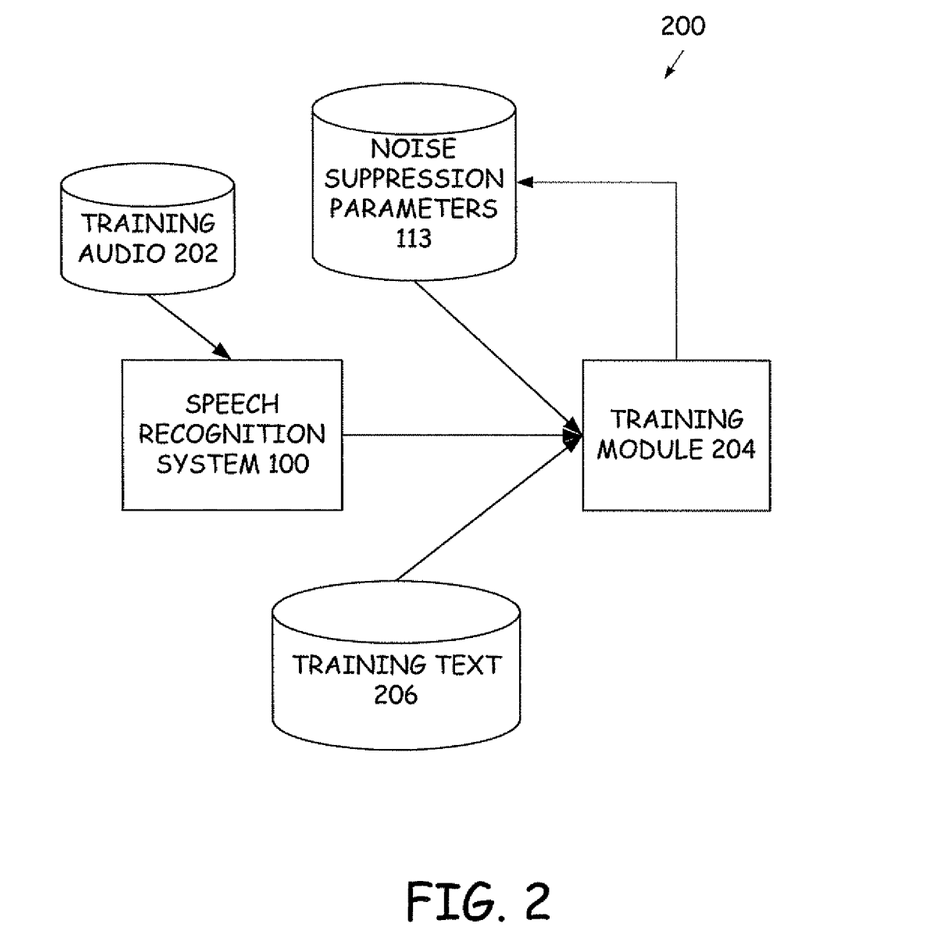
FIG. 2 is a block diagram of a parameter training system.

FIG. 2 is a block diagram of a system 200 for training noise suppression parameters 113. During training, training audio 202 is provided to speech recognition system 100. Speech recognition system 100 provides an output of possible transcriptions and associated likelihoods for the transcriptions based on the training audio 202 to a training module 204. These transcriptions and likelihoods can be stored in a lattice and used to compute posterior probabilities and gradients used in training noise suppression parameters 113. Additionally, training text 206, which includes a transcription of training audio 202, is provided to training module 204. Based on output from speech recognition system 100 and training text 206, training module 204 adjusts noise suppression parameters 113.

The noise suppression parameters 113 that are adjusted can relate to the voice activity detector, the noise model builder, the suppression gain module and/or combinations thereof. In one example, noise suppression parameters 113 form a noise suppression rule that reduce noise in a signal. For example, noisy signal $y_n$ can be represented by $y_n = x_n + d_n$, where $y_n$ represents the observed noisy signal at time index n, $x_n$ is the original signal (for example the signal provided by speaker 102), and $d_n$ is additive random noise (for example noise 106), uncorrelated with the original signal $x_n$. The noise suppression rule forms an estimate of the underlying signal $x_n$, based on the observed signal $y_n$. A set of observations can be represented as $\{y_n\}$. Using the discrete Fourier transform (transferring from a time domain to a frequency domain), a spectrum of observed noisy signals can be represented as $Y_k = X_k + D_k$, for k frequency bins per interval. For the observed spectrum, a noise suppression rule, or nonnegative real-valued gain, can be represented as $H_k$, for frequency bins k of the observed, signal spectrum $Y_k$, in order to form an estimate $\hat{X}_k$ of the original signal spectrum; $\hat{Y}_k = H_k \cdot Y_k$. This spectral estimate can be inverse-transformed to obtain the time-domain signal reconstruction if necessary.

Within such a framework, a normal distribution or Gaussian model can be effective. In this case, elements of $\{X_k\}$ and $\{D_k\}$ are modeled as independent, zero-mean, complex Gaussian random variables with variances $\lambda_x(k)$ and $\lambda_d(k)$, respectively: $X_k \sim N_2(0, \lambda_x(k)I)$, $D_k \sim N_2(0, \lambda_d(k)I)$.

One goal in noise suppression is to minimize the mean-square error (MMSE) of an estimator. One suppression rule derived using an MMSE method can be represented as $$H_k = \frac{\lambda_x}{\lambda_x + \lambda_d}.$$

In an article entitled, "Speech Enhancement Using a Minimum Mean-Square Error Short-Time Spectral Amplitude Estimator", by Y. Ephraim and D. Malah, IEEE Transactions on Acoustics, Speech and Signal Processing, Vol. ASSP-32, No. 6, December 1984, a minimum mean-square error (MMSE) short-time spectral amplitude estimator is derived based on the assumption that the Fourier expansion coefficients of the original signal and the noise may be modeled as statistically independent, zero-mean, Gaussian random variables. The article introduces an a priori and a posteriori signal-to-noise ratios (SNR) as $$\xi_k \triangleq \frac{\lambda_x(k)}{\lambda_d(k)} \text{ and } \gamma_k \triangleq \frac{|Y_k|^2}{\lambda_d(k)}$$

respectively. The disclosed suppression rule is a function of these two SNRs: $H_k = f(\xi_k, \lambda_k)$. For a given audio frame n, the decision-directed a priori SNR estimate $\xi_k$ is given by a geometric weighting of the SNR in the previous and current frames:

$$\xi_k = \alpha \frac{|X_k(n-1)|}{\lambda_d(n-1,k)} + (1-\alpha)\max[0, \gamma_k(n) - 1], \alpha \in [0, 1).$$

Current suppression rules are designed to be optimal in some sense, but can introduce distortions that damage speech features important for speech recognition. To train parameters 113 that limit this damage, a noise suppressor can be represented as $\hat{X}_k = \arg(Y_k) \cdot [H_k(\xi_k, \gamma_k) \cdot |Y_k|]$, where $H_k$ is the noise suppression rule. The noise suppression rule can be parameterized as a square L×L matrix, which includes noise suppression parameters 113. Another way of representation of the suppression rule is to parameterize it, by interpolation with some function. In this case, coefficients of this function can be the parameters representing the suppression rule.

Using this representation, derivation of the suppression rule can be converted to an optimization problem with optimization parameters which represent $H_k$ in matrix form or in form of coefficients of the interpolation function. To optimize noise suppression parameters 113 of the noise suppression rule, an objective function can be maximized. Example objective functions includes, maximum classification error (MCE), minimum word error (MWE), maximum mutual information (MMI) and minimum phone error (MPE).

Figure 3:
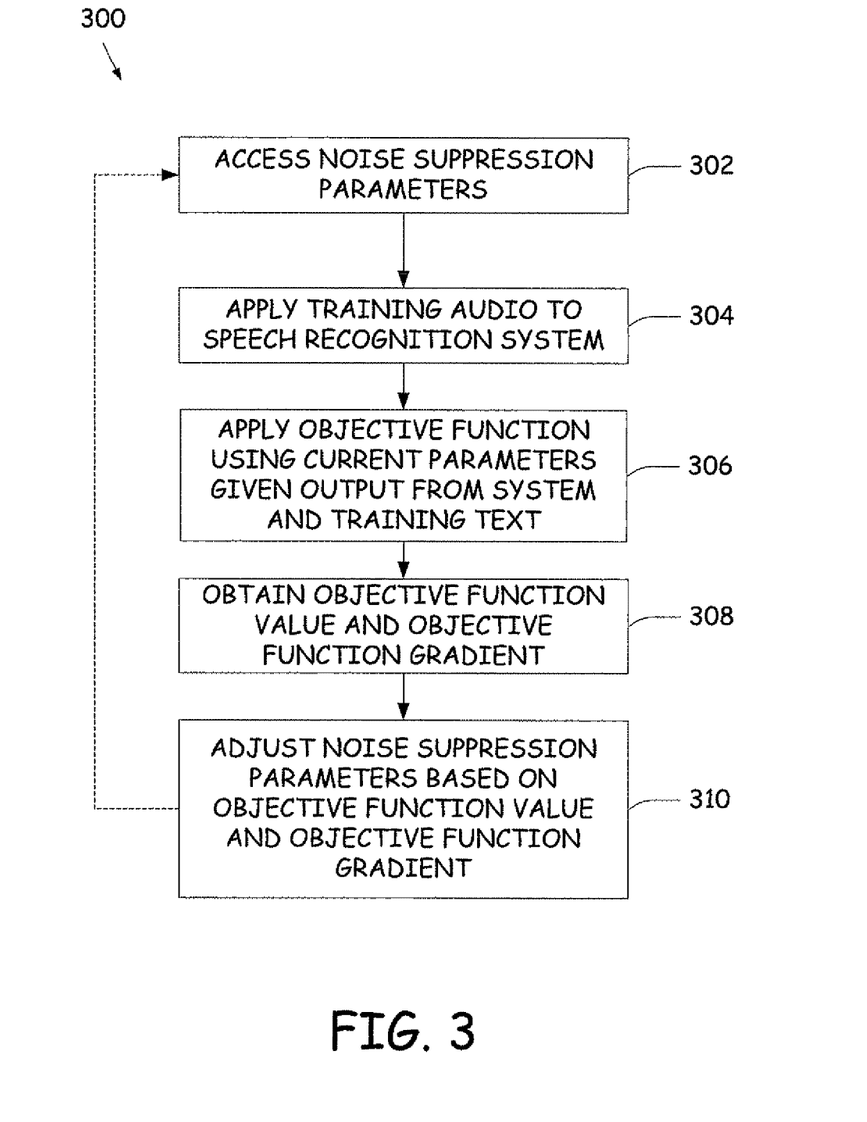
FIG. 3 is a block diagram of a method for training parameters.

FIG. 3 is a flow diagram of a method for training noise suppression parameters 113 using an objective function. In FIG. 3, the objective function is a maximum mutual information function that can be represented as a sum of log conditional probabilities for all correct transcriptions $w_r$ (based on training text 206) of utterance r given corresponding acoustics $Y_r$ (from training audio 202). At step 302, noise suppression parameters are accessed. At step 304, training audio 202 is applied to speech recognition system 100 to obtain possible transcriptions and likelihoods of the possible transcriptions. The objective function is then applied using the current parameters given the output from system 100 and the training text 206 at step 306. At step 308, the value of the objective function at the current parameter values and the gradient of the objective function with respect to each parameter at the current parameter values is obtained. The gradients can be represented as:

$$\frac{dF}{d\theta} = \sum \frac{dF}{dx_i} \frac{dx_i}{d\theta},$$

where $x_i$ are speech recognition features for the current frame and $\theta$ is a noise suppression parameter from $H_k$. The gradient $$\frac{dx_i}{d\theta}$$

of the features with respect to the noise suppression parameters was computed by using a discrete approximation to the derivative function.

Noise suppression parameters 113 are adjusted based on the objective function value and the objective function gradients for each parameter at step 310. Using the adjusted parameters, method 300 can proceed through further iterations until desired values for the noise suppression parameters have been obtained. After the iterations, the noise suppression parameters 113 can be provided for use in suppressing noise in a speech recognition system.

Figure 4:
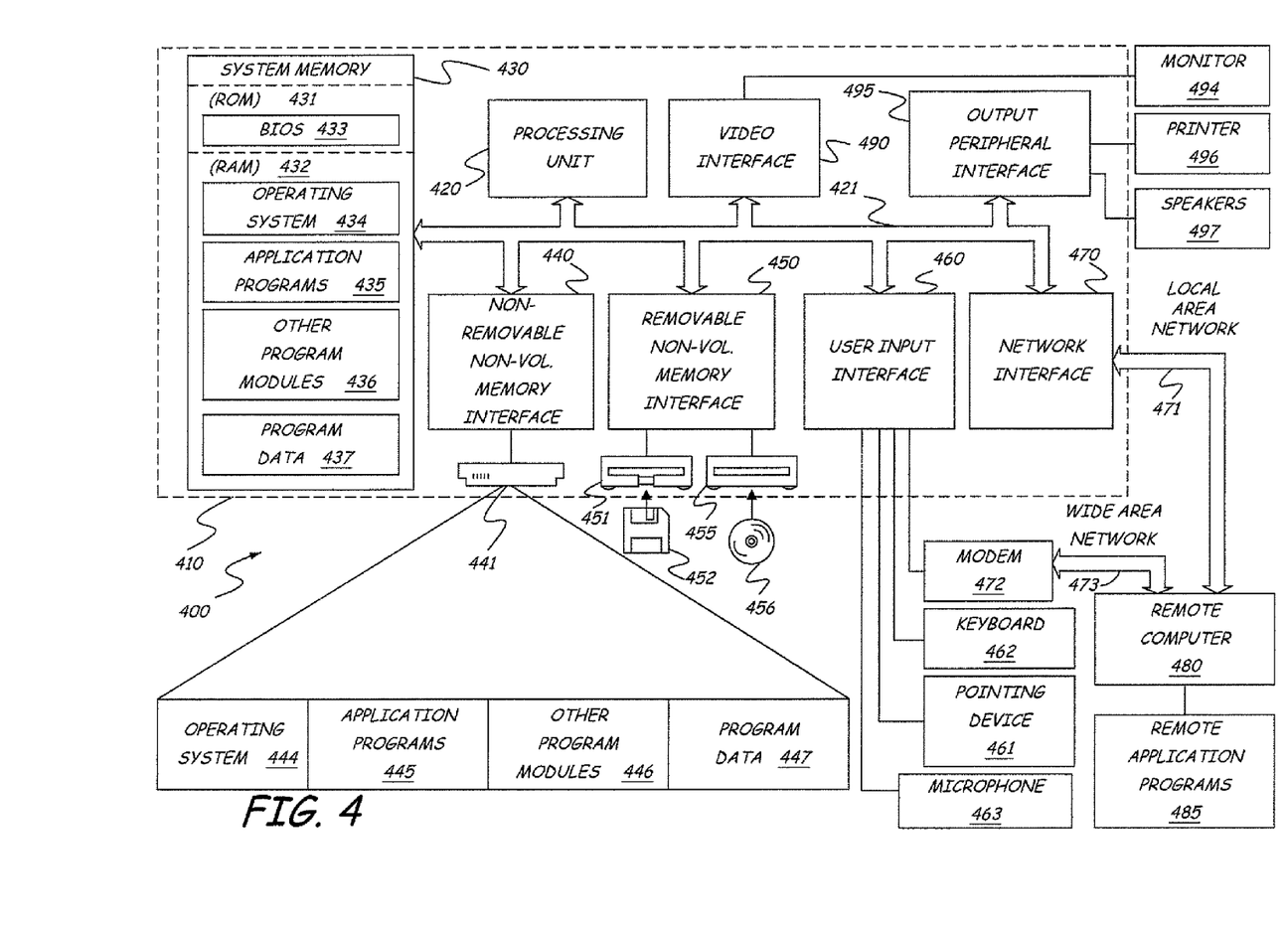
FIG. 4 is a block diagram of a general computing environment.

FIG. 4 illustrates an example of a suitable computing system environment 400 on which the concepts presented herein may be implemented. For example, speech recognition system 100, training system 200 and/or method 300 can be implemented using environment 400. The computing system environment 400 is only one example of a suitable computing environment and is not intended to suggest any limitation as to the scope of use or functionality of concepts presented herein. Neither should the computing environment 400 be interpreted as having any dependency or requirement relating to any one or combination of components illustrated in the exemplary operating environment 400.

The concepts presented herein are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The concepts presented herein may be described in the general context of computer-executable instructions, such as program modules, being executed by a computer. Generally, program modules include routines, programs, objects, components, data structures, etc. that perform particular tasks or implement particular abstract data types. Those skilled in the art can implement concepts presented herein as computer-executable instructions, which can be embodied on any form of computer readable media.

The concepts presented herein may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the concepts presented herein includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 490.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of generating a noise suppression component with a computer having a processor, the method comprising:
    accessing, with the processor, a noise suppression rule including a plurality of parameters for altering a speech signal to suppress noise in the speech signal, the plurality of parameters including a voice activity parameter, a noise model builder parameter, and a suppression gain module parameter, the voice activity parameter being utilized to assign probabilities to portions of the speech signal that constitute speech, the noise model builder parameter being utilized to build a probability model of the noise in the speech signal, and the suppression gain module parameter being utilized to determine an amount of gain to apply to the signal;
    modeling the speech signal and the noise as independent random variables with each of the random variables having an associated variance;
    applying, with the processor, a maximum mutual information function to the voice activity parameter, the noise model builder parameter, and the suppression gain module parameter to determine a sum of log conditional probabilities based on how accurately a speech recognition output from a speech recognition system represents the speech in the speech signal, the maximum mutual information function including a ratio of the variance of the speech signal to the variance of the noise;
    adjusting, with the processor, the voice activity parameter, the noise model builder parameter, and the suppression gain module parameter of the noise suppression rule to increase the sum of log conditional probabilities;
    iteratively repeating the applying and the adjusting to determine a final set of parameters of the noise suppression rule, each iteration utilizing the adjusted parameters obtained from the previous iteration as a starting basis for the current iteration; and
    providing, with the processor, an adjusted noise suppression rule, as a function of the final set of parameters, to the noise suppression component for use in suppressing noise in a signal subject to speech recognition to thereby increase the recognition accuracy rate of the speech recognition system.

2. The method of claim 1 wherein applying the maximum mutual information function further includes determining a gradient of the maximum mutual information function with respect to each parameter of the plurality of parameters and wherein adjusting the voice activity parameter, the noise model builder parameter, and the suppression gain module parameter is performed as a function of the gradients.

3. The method of claim 1 and further comprising:
    accessing a plurality of training audio signals and corresponding training text for the audio signals; and
    recognizing the speech in the training audio signals, with the speech recognition system, to generate the speech recognition output of the speech recognition system based on the training audio signals.

4. The method of claim 3 and further comprising:
    comparing the speech recognition output from the speech recognition system and corresponding training text; and
    calculating the sum of log conditional probabilities as a function of the comparison of the speech recognition output and the corresponding training text.

5. The method of claim 1 wherein the independent random variables are zero-mean, complex Gaussian random variables.

6. The method of claim 4 wherein comparing comprises comparing the speech recognition output from the speech recognition system based on the training audio signals to a correct transcription of the training audio signals.

7. The method of claim 6 wherein the sum of log conditional probabilities is based on a probability that the speech recognition output and correct transcription match.

8. A system for training a noise suppressor component by altering a noise suppression rule in the noise suppression component that alters a speech signal to suppress noise in the speech signal, comprising:
    a training audio store storing a set of training audio signals indicative of speech;
    a training text store storing a set of training text transcriptions corresponding to text of speech in the audio signals;
    a speech recognition system providing an output based on the training audio signals, the output including possible transcriptions for the training audio signals and associated likelihoods of the possible transcriptions;
    a training module applying an objective function to a plurality of parameters for the noise suppression rule to determine an objective function value based on the set of training text transcriptions stored in the training text store, on the possible transcriptions for the training audio signals, and on the associated likelihoods of the possible transcriptions, the plurality of parameters including a voice activity parameter, a noise model builder parameter, and a suppression gain module parameter, the voice activity parameter being utilized to assign probabilities to portions of the speech signal that constitute speech, the noise model builder parameter being utilized to build a probability model of the noise in the speech signal, and the suppression gain module parameter being utilized to determine an amount of gain to apply to the signal, the training module adjusting the parameters based on the objective function value to determine an a priori signal-to-noise ratio and an a posteriori signal-to-noise ratio that are utilized in implementing the noise suppression rule, the a priori signal-to-noise ratio being calculated as a ratio of a variance of the speech in the audio signals to a variance of the noise in the audio signals, and the a posteriori signal-to-noise ratio being calculated as a ratio of a signal spectrum of the speech in the audio signals to the variance of the noise in the audio signals, the training module further adjusting the parameters based on gradients of the objective function with respect to each of the parameters, the gradients being determined utilizing an equation:

$$\frac{dF}{d\theta} = \sum \frac{dF}{dx_i} \frac{dx_i}{d\theta}$$

where F represents the objective function, where θ represents the plurality of parameters for the noise suppression rule, and where $x_i$ represents speech recognition features of a current frame of the speech signal; and a computer processor being a functional component of the system and activated by the training module to facilitate applying the objective function, adjusting the parameters, and implementing the noise suppression rule.

9. The system of claim 8 wherein the a priori signal-to-noise ratio is estimated utilizing a geometric weighting of a previous frame and the current frame of the speech signal.

10. The system of claim 8 wherein the training module compares output of the speech recognition system and corresponding training text transcriptions and calculates the objective function value as a function of the comparison of the output and the corresponding training text.

11. The system of claim 8 wherein calculating the a priori signal-to-noise ratio and the a posteriori signal-to-noise ratio comprises utilizing a discrete Fourier transform to convert the audio signals from a time domain to a frequency domain.

12. The system of claim 8 wherein the output from the speech recognition system is compared to a correct transcription of an input to the speech recognition system.

13. The system of claim 12 wherein the objective function value is based on a probability that the output and transcription match.

14. A speech recognition system recognizing speech in an input speech signal, comprising:
   an input component receiving the input speech signal in a series of frames from a frame constructor;
   a noise suppressor, including a noise suppression rule, receiving the series of frames from the frame constructor and altering the series of frames as a function of parameters in the noise suppression rule, one of the parameters in the noise suppression rule being determined based at least in part upon a geometric weighting of a signal-to-noise ratio of a previous frame in the series of frames and of a signal-to-noise ratio of a current frame in the series of frames, the parameters in the noise suppression rule defining parameters of a voice activity detector that assigns probabilities to portions of the input speech signal that constitute the speech, a noise model builder that builds a model of a probability of noise in the input speech signal, and a suppression gain module that determines an amount of gain to apply to the input speech signal, the parameters in the noise suppression rule being calculated using a maximum mutual information (MMI) function having a function value calculated by comparing a recognition result for a set of audio signals and corresponding transcript text that is a correct transcription of speech in the audio signals, to increase an accuracy of the recognition result;
   an output component providing altered frames based on the parameters in the noise suppression rule;
   a feature extractor component that receives the altered frames and generates a stream of feature vectors that is associated with the series of frames from the frame constructor;
   a speech recognizer recognizing speech based on the stream of feature vectors; and
   a computer processor being a functional component of the speech recognition system and activated by the noise suppressor to facilitate altering the speech signal.

15. The speech recognition system of claim 14 wherein the MMI function is optimized by determining a gradient of the objective function with respect to each parameter in the noise suppression rule and by adjusting at least one of the parameters in the noise suppression rule as a function of the gradients, and wherein the feature extractor component is selected from the group consisting of a Linear Predictive Coding module, a Perceptive Linear Prediction module, and a Mel-Frequency Cepstrum Coefficients module.

16. The speech recognition system of claim 14 wherein the set of audio signals comprise a plurality of training audio signals and wherein the corresponding transcript text comprises corresponding training text for the audio signals and wherein the parameters in the noise suppression rule are calculated, based on the training audio signals, by optimizing the MMI function.

17. The speech recognition system of claim 14 wherein each of the signal-to-noise ratios is based at least in part on a variance.

18. The speech recognition system of claim 14 wherein an output from the speech recognition system is compared to a correct transcription of an input to the speech recognition system to determine a value for the MMI function.

19. The speech recognition system of claim 18 wherein the value is based on a probability that the output and transcription match.

\* \* \* \* \*